Jan. 29, 1935.    J. E. LILIENFELD    1,989,623
SYSTEM OF OPERATING ALTERNATING CURRENT ELECTROLYTIC CONDENSERS
Filed Oct. 31, 1931

INVENTOR
JULIUS EDGAR LILIENFELD
BY
*Fred H. Schuth*
ATTORNEY

Patented Jan. 29, 1935

1,989,623

UNITED STATES PATENT OFFICE 1,989,623

SYSTEM OF OPERATING ALTERNATING CURRENT ELECTROLYTIC CONDENSERS

Julius Edgar Lilienfeld, Winchester, Mass., assignor to Ergon Research Laboratories, Inc., a corporation of Delaware Application October 31, 1931, Serial No. 572,296

4 Claims. (Cl. 175—315)

The invention relates to the operation of alternating current electrolytic condensers, and more particularly in connection with an operation of such condensers involving the use of a biasing voltage for the cathodic electrode or electrolyte of the condenser.

It has been observed in the operation of these condensers that when the same are disconnected from the source of A. C. supply, the formed layers of the anodic electrodes disorganize or deteriorate; and this effect manifests itself when the condenser, after a period of idling, is again reconnected to the line. That is to say, the layer has then to go through a period of reorganization or formation and during which period there prevails a much higher electrical leak than is observed during the continuous operation of the condenser.

For many reasons it is highly desirable to eliminate this reorganization period of a layer. For example, it is a very simple matter to design small and inexpensive rectifiers for use with a condenser operating continuously; but, if such rectifiers are also to accommodate large leakage during the period of reorganization of a layer, then the same must be accordingly designed and will be considerably more expensive, not only with respect to their initial cost but with respect to the cost of operation.

The invention has for an object to avoid this deterioration of a layer in the provision of means for maintaining automatically, through the rectifiers, the electrolyte at the biasing voltage, or at an increased biasing voltage, during the period of idling of the condenser.

By this expedient, the voltage of the electrolyte with respect to the condenser plates is maintained at all times and thus prevents the disorganization aforesaid. Furthermore, the energy spent in the biasing circuit during the idling period is only negligible since the electric leak of a condenser is extremely low while its layer is in the full condition of organization.

In carrying out the invention, the electrolyte is biased from the secondary of a transformer, which secondary is also included in circuit with the rectifiers and anodic electrodes of the condenser, the primary of the transformer being connected in advance of a line switch or the like supplying alternating current to the condenser. In a modified embodiment of the invention, the primary of the transformer is constituted by two coils—one for normal operation being connected beyond a line-switch which is utilized to connect in the condenser when the switch is closed, and the other adapted to be connected to the line when the first-named primary is disconnected therefrom by said line switch. By this expedient, a higher biasing voltage may be applied during the idling period, which in some instances may be of advantage.

The nature of the invention, however, will best be understood when described in connection with the accompanying drawing, in which.

Figure 1:
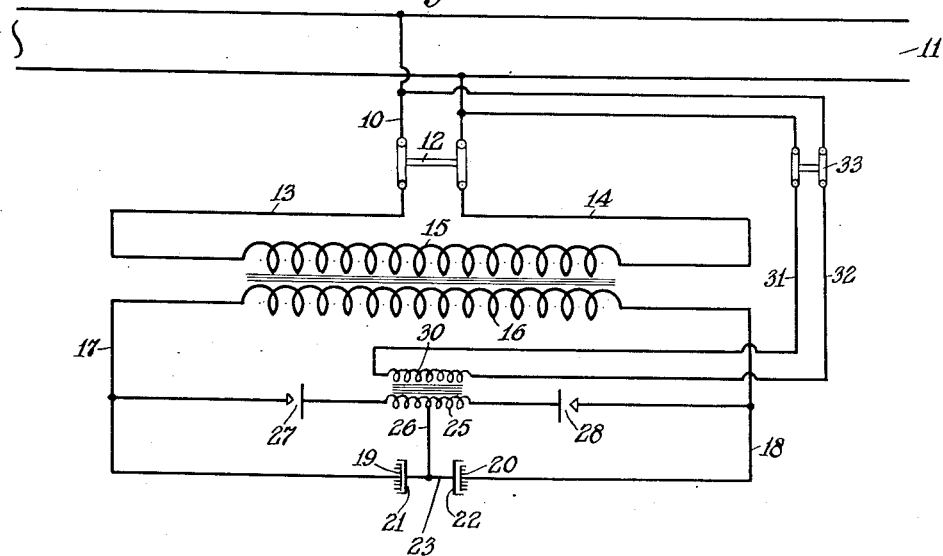
Fig. 1 is a diagrammatic view illustrating the novel circuit involved in the operation of an electrolytic condenser and including the means for maintaining a bias to its electrolyte during idling periods.

Referring to the drawing, 10 designates the mains connected with the line 11 of a source of alternating current supply, and there is included in said mains a double-pole switch 12 for opening and closing the same. The leads 13 and 14 from this switch are connected to the primary 15 of a transformer whose secondary 16 is connected by the leads 17 and 18 across a pair of anodically filmed electrodes 19 and 20 of a condenser embodying also the cathodic electrodes 21 and 22 connected together by means of the conductor 23.

It is understood that these electrodes are to be immersed in a suitable electrolyte in accordance with the usual practice and may all be retained within one container which itself is at the potential of the electrolyte. This potential is established from the secondary 25 of a transformer through a conductor 26 connected to the midpoint of the secondary and to the electrolyte through the conductor 23, thus biasing the electrolyte. The secondary 25, furthermore, is in series with one or more uni-directional members or rectifiers 27 and 28, respectively, whereby said members will serve to by-pass the corresponding anodic electrodes to the electrolyte only for current arriving negatively at the former, all of which is more fully set forth in my copending application, Serial Number 462,252, filed June 19, 1930.

The cooperating primary 30 of the said secondary 25 is connected through the leads 31 and 32 to the mains 10 such that the connection will be in advance of the line switch 12. If desired, a suitable switch, as the double-pole switch 33, may be included in the leads 31 and 32 for emergency operation, but normally the primary 30 is continuously in circuit with the line 11. Thus, if line switch 12 be opened, the condenser will be cut off from the line 11 but primary 30 will remain in circuit therewith to energize secondary 25 of the transformer for suitably biasing the electrolyte.

Figure 2:
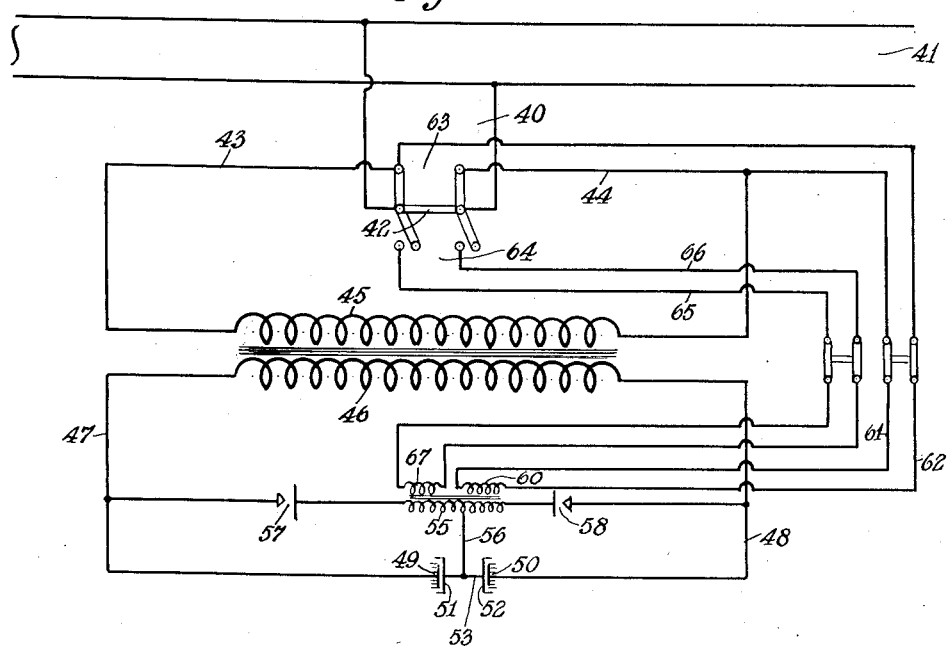
Fig. 2 is a similar view illustrating a modification.

Under certain conditions, it is desirable that the biasing voltage be substantially increased during the idling period of the condenser, and to this end the biasing transformer is somewhat modified and the connection of its primary to the line also altered. Referring to Fig. 2 of the drawing, the mains 40 which are connected to the line 41 include a double-throw double-pole switch 42 for supplying current through leads 43 and 44 to a primary 45 of a transformer. The secondary 46 of this transformer is connected through the leads 47 and 48 to the anodic electrodes 49 and 50 of the condensers having associated therewith the cathodic electrodes 51 and 52 which are connected together by the conductor 53. The secondary 55 of the biasing transformer is connected from its midpoint by lead 56 to the conductor 53, and is also included in series with the uni-directional or rectifying elements 57 and 58.

A primary coil 60 of the biasing transformer is associated with the secondary 55 thereof and is connected through the leads 61 and 62 to one set of poles 63 of the line switch 42. The other set of poles 64 is connected through the leads 65 and 66 to a further primary coil 67 so that one or the other of these primary coils 60 or 67 is energized accordingly as the line switch 42 is manipulated. That is to say, when the main 40 is connected to the terminals or poles 63, primary 60 will be energized to bias the electrolyte, but when this switch is opened to disconnect the condenser from line 41, primary 60 is likewise cut off from said line. At the same time, however, the circuit is closed by the switch 42 to the poles 64 causing the other primary coil 67 to be energized and to provide for a higher voltage in the secondary 55 than previously obtained. Thus, in either circumstance the electrolyte will be biased, the bias during idling periods being at a substantially higher voltage.

I claim:

1. An alternating current electrolytic condenser system, comprising a pair of filmed anodic electrodes and electrolyte means associated therewith, cathodic means contacting said electrolyte means and in spaced relation to said anodic electrodes, a source of alternating current, means for connecting said anodic electrodes to the source of alternating current and disconnecting the same for idling, a biasing circuit to be connected to the source of alternating current for maintaining said cathodic and electrolyte means negatively biased with respect to said anodic electrodes, and means for connecting said biasing circuit to the source of alternating current irrespective of whether said anodic electrodes are connected to or disconnected from said source.

2. An alternating current electrolytic condenser system, comprising a pair of filmed anodic electrodes and electrolyte means associated therewith, cathodic means contacting said electrolyte means and in spaced relation to said anodic electrodes, a source of alternating current, a biasing circuit and means connecting the same to the source of alternating current for maintaining said cathodic and electrolyte means negatively biased with respect to said anodic electrodes, means for connecting said anodic electrodes to the source of alternating current and disconnecting the same for idling independent of the means for connecting said biasing circuit.

3. An alternating current electrolytic condenser system, comprising a pair of filmed anodic electrodes and electrolyte means associated therewith, cathodic means contacting said electrolyte means and in spaced relation to said anodic electrodes, input terminals for connection to an alternating current source, means for connecting said anodic electrodes to the input terminals and disconnecting the same for idling, a transformer having a primary side and a secondary side, a connection between the midpoint of said secondary side and said cathodic means, a pair of uni-directional members respectively connected between the ends of said secondary side and said anodic electrodes so as to permit the discharge of negative current from the latter to the cathodic means, and means for connecting the primary side of said transformer to said input terminals irrespective of whether said anodic electrodes are connected to or disconnected from said terminals.

4. An alternating current electrolytic condenser system, comprising a pair of filmed anodic electrodes and electrolyte means associated therewith, cathodic means contacting said electrolyte means and in spaced relation to said anodic electrodes, input terminals for connection to an alternating current source, means for connecting said anodic electrodes to the input terminals and disconnecting the same for idling, a transformer having a primary side and a secondary side, a connection between the midpoint of said secondary side and said cathodic means, a pair of uni-directional members respectively connected between the ends of said secondary side and said anodic electrodes so as to permit the discharge of negative current from the latter to the cathodic means, means for connecting a predetermined number of turns on the primary side of said transformer to said input terminals when said anodic electrodes are connected thereto, and means for connecting a lesser number of turns on the primary side of said transformer to said input terminals when said anodic electrodes are disconnected therefrom.

JULIUS EDGAR LILIENFELD.